United States Patent
Demaret et al.

(10) Patent No.: US 7,346,219 B2
(45) Date of Patent: Mar. 18, 2008

(54) METHODS AND DEVICES FOR ENCODING AND DECODING IMAGES USING NESTED MESHES, PROGRAMME, SIGNAL AND CORRESPONDING USES

(75) Inventors: Laurent Demaret, Rennes (FR); Nathalie Laurent-Chatenet, Vignoc (FR)

(73) Assignee: France Telecom, Paris (FR)

( * ) Notice: Subject to any disclaimer, the term of this patent is extended or adjusted under 35 U.S.C. 154(b) by 595 days.

(21) Appl. No.: 10/479,904

(22) PCT Filed: Jun. 6, 2002

(86) PCT No.: PCT/FR02/01937

§ 371 (c)(1),
(2), (4) Date: Jun. 29, 2004

(87) PCT Pub. No.: WO02/100111

PCT Pub. Date: Dec. 12, 2002

(65) Prior Publication Data

US 2004/0218824 A1    Nov. 4, 2004

(30) Foreign Application Priority Data

Jun. 6, 2001   (FR) .................................. 01 07406

(51) Int. Cl.
*G06K 9/36* (2006.01)
(52) U.S. Cl. ...................... 382/248; 382/232; 382/240; 382/241; 375/240; 375/240.04
(58) Field of Classification Search ................ 382/240, 382/241, 248, 103, 232; 375/240.04, 240
See application file for complete search history.

(56) References Cited

U.S. PATENT DOCUMENTS 6,144,773 A * 11/2000 Kolarov et al. ............. 382/240

(Continued)

FOREIGN PATENT DOCUMENTS

EP    0784295    7/1997

(Continued)

OTHER PUBLICATIONS

Stollnitz, E. J., et al. "Wavelets for Computer Graphics: A Primer, Part 2." IEEE Computer Graphics and Applications 15(1995): 75-85.*

(Continued)

*Primary Examiner*—Samir Ahmed
*Assistant Examiner*—Michael A Newman
(74) *Attorney, Agent, or Firm*—Shewchuk IP Services; Jeffrey D. Shewchuk

(57) ABSTRACT

The invention concerns a method for encoding at least a source image using a hierarchical mesh defining at least two nested spaces corresponding each to a decomposition level of said meshing, which consists, at least at a decomposition level n (except the first decomposition level), in delivering only image coefficients expressed in a base of functions defined in a space orthogonal to the space corresponding to the preceding decomposition level n−1, said functions being selected so that said image coefficients enable to optimize for said decomposition level n the data already transmitted for the preceding decomposition level n−1, so as to produce a reconstructed image, representing said source image, with optimized restoration quality for said decomposition level n.

25 Claims, 3 Drawing Sheets

U.S. PATENT DOCUMENTS

| | | | |
|---|---|---|---|
| 6,314,205 B1* | 11/2001 | Masuda et al. | 382/232 |
| 6,700,933 B1* | 3/2004 | Wu et al. | 375/240.16 |
| 6,791,543 B2* | 9/2004 | Kawanaka | 345/423 |
| 6,931,155 B1* | 8/2005 | Gioia | 382/232 |
| 6,985,526 B2* | 1/2006 | Bottreau et al. | 375/240.1 |
| 2002/0118742 A1* | 8/2002 | Puri et al. | 375/240.1 |

FOREIGN PATENT DOCUMENTS

| | | |
|---|---|---|
| FR | 2781908 | 4/2000 |
| WO | WO 00/19380 | 4/2000 |

OTHER PUBLICATIONS

Stollnitz, E. J., et al. "Wavelets for Computer Graphics: A Primer, Part 1." IEEE Computer Graphics and Applications 15(1995): 76-84.*

DeRose, T. D. "Multiresolution Surfaces for Compression, Display and Editing." SIGGRAPH '96 Course Notes—Wavelets in Computer Graphics (1996): 129-141.*

Eck, Matthias, et al. "Multiresolution Analysis of Arbitrary Meshes." Proceedings of the 22nd annual conference on Computer graphics and interactive techniques (1995): 173-182.*

Stollnitz, E. J., et al. "Wavelets for Computer Graphics: A Primer, Part 2." IEEE Computer Graphics and Applications 15(1995): 75-85 which as published includes the content of Stollnitz, E. J., et al. "Wavelets for Computer Graphics: A Primer, Part 1." IEEE Computer Graphics and Applications 15(1995): 76-84.*

Marquant G: "These//Representation Par Maiilage Adaptatif Deformable Pour La Manipulation Et La Communication D'objets Video" These L'universite De Rennes, vol. 2453, 2000.

Valette S et al: "A Multiresolution Wavelet Scheme For Irregularly Subdivided 3d Triangular Mesh" Proceedings. International Conference On Image Processing, vol. 1, 1999.

Lechat P et al: "Combined Mesh Based Image Representation And Motion Estimation, Application To Video Coding" Proceedings Of The 1998 International Conference On Image.

Floater M S et al: "Piecewise Linear Prewavelets On Arbitrary Triangulations" Numerische Mathematik, Springer Verlag, Berlin,, DE,vol. 82, No. 2, 1999, p. 221-252.

Murat Tekalp A et al: "Two-Dimensional Mesh-Based Visual-Object Representation For Interactive Synthetic/Natural Digital Video" Proceedings Of The IEEE, Jun. 1998, New York.

Quak E et al: "Algorithms For Spline Wavelet Packets On An Interval" Bit, Lund, SE, vol. 37, no. 1, Mar. 1997, p. 76-95.

Guskov I et al: "Normal Meshes" Computer Graphics. Siggraph 2000 Conference Proceedings. New Orleans, LA, Jul. 23-28, 2000, Computer Graphics Proceedings. Siggraph, NY.

* cited by examiner

METHODS AND DEVICES FOR ENCODING AND DECODING IMAGES USING NESTED MESHES, PROGRAMME, SIGNAL AND CORRESPONDING USES

CROSS-REFERENCE TO RELATED APPLICATION

This Application is a Section 371 National Stage Application of International Application No. PCT/FR02/01937 filed Jun. 6, 2002 and published as WO 02/100111 on Dec. 12, 2002, not in English.

FIELD OF THE INVENTION

The field of the invention is that of the encoding of images, especially for their transmission or storage. More specifically, the invention relates to an improvement of hierarchical encoding techniques, implementing a hierarchy of nested meshes.

BACKGROUND OF THE INVENTION

The nested mesh approach has already been the subject of many studies. It is presented for example in [7] (for the sake of readability, the various documents cited are brought together in appendix 3, at the end of the present description) in the case of video image encoding.

A mesh is classically defined by a set of vertices and oriented faces (FIG. 1) defining a topology. Such meshes are used for example in computer graphics, for the modeling of objects in three dimensions with limited geometrical complexity.

The approximation of a mesh M consists in finding a mesh M' whose geometrical complexity is lower than that of the mesh M, and that approaches the geometry of M as closely as possible.

Advantageously, the mesh M' consists of a succession of nested meshes, each corresponding to a level of detail, or hierarchical level, so as to enable a gradual reconstruction of the images and a simplified encoding.

At each hierarchical level, the nodal values of the mesh are optimized to minimize the squared error of reconstruction. These nodal values are then quantified and encoded. A method of this kind gives efficient compression rates and limits visual deterioration. This deterioration corresponds here rather to the smoothing effects, which are less disagreeable to the human eye. This is related to the good properties of continuity of the reconstructed surfaces obtained by the method of approximation by meshes.

Furthermore, this scheme proves to be well suited to video applications. Indeed, triangular meshes prove to be more flexible and efficient for motion estimation.

However, the inventors have observed that this compression technique suffers from a sub-optimality defect. Indeed, the bases used for each level show redundancies.

Furthermore, the nested mesh technique enables the gradual reconstruction of the images, first of all at a coarse level, and then at a gradually refined level (with a scalable transmission of the images). According to the -classic technique, this approach however is not optimized: indeed, the quality obtained at each level (except for the last level) is not optimal.

There are also known image compression techniques based on the exploitation of inter-subband correlations obtained from a filtering operation implementing wavelets. These techniques permit high-performance compression rates [4] [5].

However, for applications for which there is only a very low bit rate available, the methods are seen to give considerable visual deterioration, especially in the form of oscillatory effects along the contours.

Furthermore, the wavelet bases used are built as one-dimensional wavelet tensor products. This induces a limitation of the capacity to represent certain structures while favoring certain directions. These defects, proper to the methods of image encoding by subbands, have led to preference being given to a representation of the image based on nested triangular meshes.

In the document [1], E. Quak suggests the simultaneous use of both techniques, associating a base of complementary wavelets with each mesh level in giving conditions on the ridges. He thus builds an explicit base of pre-wavelets on a triangular mesh. This technique is intended for the representation and compression of 3D digital models of terrains.

Quak's method of proceeding is described in greater detail in Appendix 1.

Appendix 2 for its part recalls the general principle and the broad lines of operation of the encoding method based on a hierarchy of nested meshes.

Although efficient, the known technique described in this Appendix 2 has certain limits.

In particular, one drawback of this method as proposed in [7], lies in the non-orthogonality of the functions $\phi_i^{(p)}$ with the vector space $V_{p-1}$ generated by the functions $\phi_i^{(p-1)}$. This implies a concentration of energy that is less efficient than it is in the case of the transforms using orthogonal transformation bases.

Furthermore, this raises a problem of cohabitation of different levels of resolution. Thus, when a vertex is at the boundary between a refined zone and an unrefined zone, it is not possible to choose an optimum value for this vertex for both resolutions. Indeed, for a vertex of this kind, choosing one of the values of one of the optimization levels will not give the optimum reconstruction except in the region corresponding to this level of refinement.

Furthermore, this sub-optimality of the representation is also a drawback in the context of a scalable encoding scheme. Indeed, it cannot be used to provide optimum reconstruction quality for intermediate bit rates.

It is a goal of the invention in particular to overcome these drawbacks of the prior art.

More specifically, it is a goal of the invention to provide a scalable image encoding technique and a corresponding decoding technique by which it is possible to obtain a quality of optimum reconstruction at each reconstruction level.

It is another goal of the invention to provide encoding and decoding techniques of this kind that necessitate a limited bit rate, for each reconstruction level.

It is also a goal of the invention to provide such encoding and decoding techniques, that enable the efficient processing of several images having the same structure (the same size and the same reference mesh).

It is yet another goal of the invention to provide a data and signal structure that makes it possible to optimize the bit rates necessary for the transmission and storage of images encoded in this way.

These goals, as well as others that shall appear more clearly here below, are achieved by means of a method for the encoding of at least one source image implementing a hierarchical mesh defining at least two nested spaces, each corresponding to a level n of decomposition of said mesh.

BRIEF SUMMARY OF THE INVENTION

According to the invention, at least at one decomposition level n (except for the first level of decomposition), there are delivered only image coefficients expressed in a base of functions defined in a space orthogonal to the space corresponding to the preceding decomposition level n−1, said functions being selected so that said image coefficients enable the optimizing, for said decomposition level n, of the information already transmitted for the preceding decomposition level n−1, so as to produce a reconstructed image, representing said source image, with a quality of restoration optimized for said decomposition level n.

Advantageously, at all of said levels of decomposition (except for said first level of decomposition), there are delivered only image coefficients expressed in a base of functions defined in a space orthogonal to the space corresponding to the preceding decomposition level n−1.

Advantageously, with said decomposition level n, there is associated a mathematical space of representation of the image $V_n$ such that $V_n = V_{n-1} \oplus W_{n-1}$, where:

$V_{n-1}$ is the space associated with the decomposition level n−1;

$W_{n-1}$ is a space orthogonal to $V_{n-1}$, and with said space $V_n$ there is associated, firstly, a base of piecewise affine functions $\phi_n$ and secondly a base formed by the combination of two orthogonal bases:

A base of piecewise affine functions $\phi_{n-1}$ of said space $V_{n-1}$;

A base of functions of pre-wavelets $\psi_{n-1}$ of said space $W_{n-1}$, in which said image coefficients are expressed.

In other words, the step of sending coefficients of the refined mesh is replaced by the taking into account of the coefficients of the unrefined mesh (the previous level) to which there is added the sending of the coefficients assigned to the new nodes of the refined mesh. The processing of the new nodes also enables the optimizing of the position of the coefficients of the previous levels, so as to be the optimum at each level.

One advantage of such a method lies in the improved statistical distribution of the value of the coefficients, enabling a reduction of the cost of encoding. With a simple transmission of the coefficients starting from the least refined vertices, the new method enables the performance of a first representation of the image from these optimum coefficients alone for this level of resolution. By contrast, in the known methods, the first coefficients correspond to the value for these vertices that is optimized for the highest level of refinement of the mesh (we therefore have sub-optimality).

Preferably, said pre-wavelet functions are mutually orthogonal wavelet functions.

Advantageously, each of said pre-wavelet functions has a narrow support, limited to a predefined number of vertices of said mesh located in the neighborhood of a reference vertex for said function.

According to a first mode of implementation of the invention, said pre-wavelet functions are one-dimensional. In this case, each of said pre-wavelet functions is advantageously determined in taking account of the position, in said mesh, of at least one ridge bearing a new vertex of said mesh to which said function will be assigned.

Thus, the base $\phi_i^{(p+1)}$ may be obtained especially by means of the following equation.

$$\varphi_i^{(p+1)} = \varphi_i^{(p)} + \frac{1}{2} \sum_{j \in V_i^{(p)}} \varphi_j^{(p)}$$

where $V_i^{(p)}$ is the set of vertices neighboring the vertex j in the level p mesh.

According to another embodiment of the invention, said pre-wavelet functions are multidimensional. In particular, they may be "box spline" type functions.

Advantageously, the determining of the image coefficients at a mesh level n relies on the resolution of a linear system:

$$A^{(p-1)} X = \alpha^{(p)}$$

with $$A^{(p-1)} = \begin{pmatrix} V^{(p-1)} \\ W^{(p-1)} \end{pmatrix}$$

where X is the vector of coordinates of approximation of said source image $\alpha^{(p)}$, $W^{(p-1)}$ is the matrix of passage from the base $(\phi_i^{(p-1)})$ of the space $V_{p-1}$ to the base of pre-wavelet functions of the space $W_{p-1}$ and $V^{(p-1)}$ is the matrix of the space $V_{p-1}$.

This approach proves to be highly efficient, especially when the resolution of said linear system implements an algorithm of the "sparse matrix" or "profile matrix" type.

According to an advantageous aspect of the invention, the encoding method of the invention comprises:

a preliminary step for determining the bases of reference functions $\phi_n$ and $\psi_n$ for a predetermined image structure;

an image encoding step systematically using said bases of reference functions $\phi_n$ and $\psi_n$ for any image having said predetermined image structure.

The encoding of the set of images of a same type is thus particularly simplified.

During said preliminary step, advantageously at least two sets of bases of reference functions $\phi_n$ and $\psi_n$ are determined, each corresponding to a particular predetermined image structure.

The invention also relates to a method for the construction of bases of functions for the hierarchical encoding of source images implementing a hierarchical mesh defining at least two nested spaces, each corresponding to a level n of decomposition of said mesh. According to the invention, for at least one predetermined image structure, at least one decomposition level n has, and preferably all the levels (except for the first decomposition level) have, an associated mathematical space representing an image $V_n$ such that $V_n = V_{n-1} \oplus W_{n-1}$, where:

$V_{n-1}$ is the space associated with the decomposition level n−1;

$W_{n-1}$ is a space orthogonal to $V_{n-1}$, and with said space $V_n$ there is associated, firstly, a base of piecewise affine functions $\phi_n$ and secondly a base formed by the combination of two orthogonal bases:

A base of piecewise affine functions $\phi_{n-1}$ of said space $V_{n-1}$;

A base of functions of pre-wavelets $\psi_{n-1}$ of said space $W_{n-1}$, in which it is possible to express image coefficients for any image having said image structure, enabling the production of a reconstructed image representing said source image with a quality of restoration optimized for said decomposition level n.

The invention also relates to image encoding devices, implementing the method for the encoding and/or construction of bases described here above.

Thus, the invention relates to a device for the encoding of at least one source image implementing a hierarchical mesh defining at least two nested spaces, each corresponding to a level n of decomposition of said mesh in which, with at least one decomposition level n (except for the first level of decomposition), it associates solely image coefficients expressed in a base of functions defined in a space orthogonal to the space corresponding to the preceding decomposition level n−1, said functions being selected so that said image coefficients enable the optimizing, for said decomposition level n, of the information already transmitted for the preceding level n−1 of decomposition, so as to produce a reconstructed image, representing said source image, with a quality of restoration optimized for said decomposition level n.

The invention also relates to a method for the decoding of images encoded by means of the encoding method and/or the construction of bases described here above.

A decoding method of this kind decodes images encoded in the form of image coefficients obtained by the implementation of a hierarchical mesh defining at least two nested spaces, each corresponding to a level n of decomposition of said mesh, according to an encoding which associates, with at least one decomposition level n (except for the first decomposition level), solely image coefficients expressed in a base of functions defined in a space orthogonal to the space corresponding to the preceding level n−1 of decomposition, said functions being selected so that said image coefficients enable the optimizing, for said decomposition level n, of the information already transmitted for the preceding level n−1 of decomposition, so as to produce a reconstructed image, representing said source image, with a quality of restoration optimized for said decomposition level n.

Advantageously, a decoding method of this kind comprises:

a preliminary step for the reception and/or storage of bases of reference functions for at least one predetermined image structure;

an image decoding step, using the bases of reference functions corresponding to the image structure of the image to be decoded.

Again, this simplifies the processing operations and limits the quantity of the data to be transmitted, for a series of images.

The invention also relates to a device for the decoding of encoded images, implementing the decoding method described here above.

The invention also relates to a computer program for the encoding and/or decoding of images, characterized in that it comprises program instructions to implement the encoding method and/or the decoding method described here above.

The invention also relates to an image data signal, characterized in that it comprises a first part comprising data representing at least one set of bases of reference functions for at least one predetermined image structure, and a second part comprising data representing at least two images encoded by means of one of said sets of bases of reference functions.

Advantageously, said first part comprises at least two sets of bases of reference functions, corresponding to distinct image structures, and each image of said second part comprises a piece of information enabling the selection of one of said sets of bases of reference functions.

Preferably, the data of said first part and/or said second part are organized so as to enable a gradual image reconstruction and/or with a predetermined level of reconstruction quality.

According to a preferred characteristic, said images are encoded according to a method implementing a hierarchical mesh defining at least two nested spaces, each corresponding to a level n of decomposition of said mesh, said reference functions being selected so that said image coefficients enable the optimizing, for said decomposition level n, of the information already transmitted for the preceding level n−1 of decomposition, the encoding of the images associating, with every decomposition level n (except for the first level of decomposition), only image coefficients expressed in a base of functions defined in a space orthogonal to the space corresponding to the preceding level n−1 of decomposition, so as to produce a reconstructed image, representing a source image, with a quality of restoration optimized for said decomposition level n.

The invention can be applied in many fields, and especially to the encoding of fixed images and the encoding of intra images of a stream of moving images.

BRIEF DESCRIPTION OR THE DRAWINGS

Other features and advantages of the invention shall appear from the following description of preferred embodiments of the invention, given by way of simple non-restrictive illustrative examples, and from the appended drawings, of which:

Figure 5:
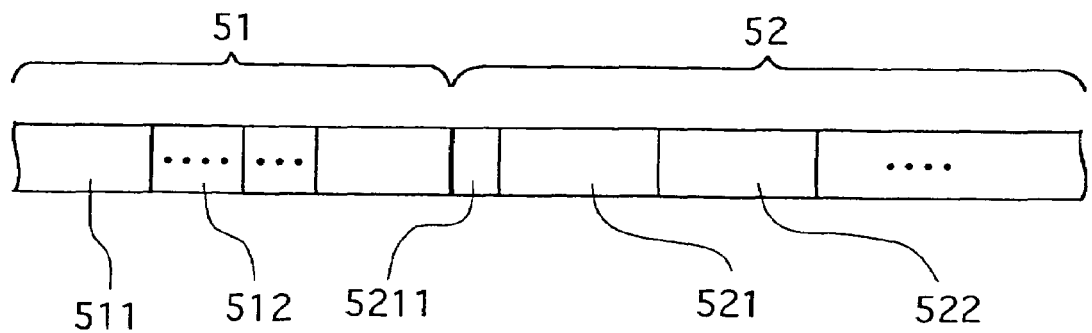
Figure 2B:
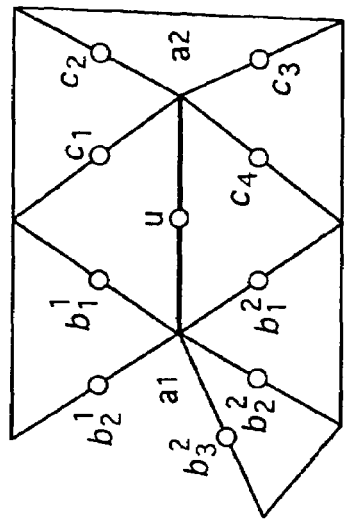
FIGS. 2A to 2D show different positions of a ridge in a mesh according to Quak's approach, discussed in Appendix 1.
Figure 2D:
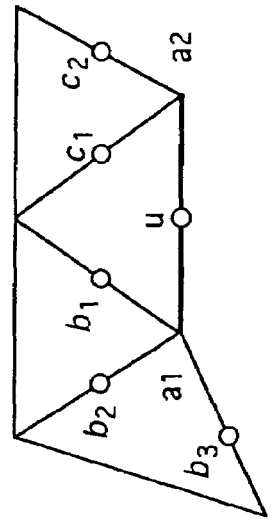
Figure 2A:
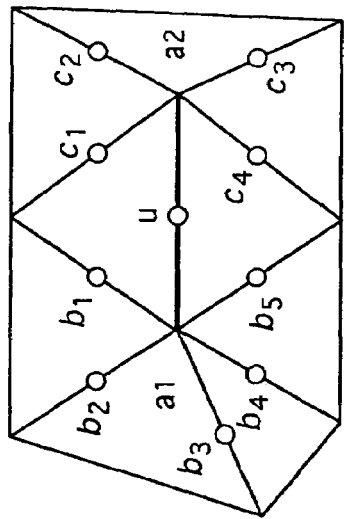
Figure 2C:
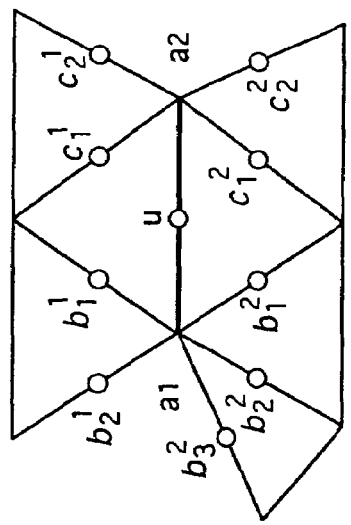
Figure 3:
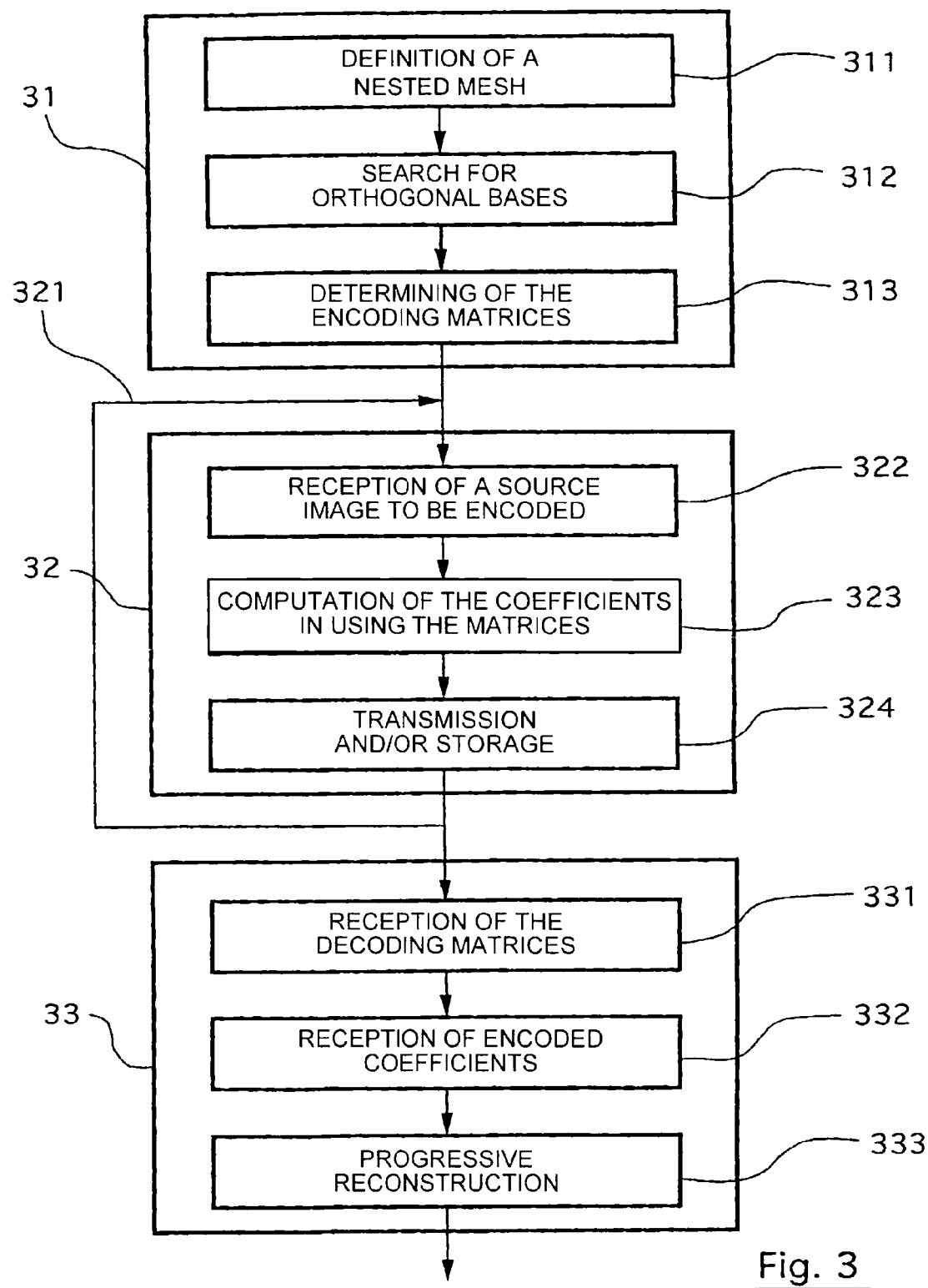
FIG. 3 is a simplified block diagram showing the general principle of an embodiment of the invention.

FIG. 5 exemplifies a structure of the signal exploiting the principle illustrated in FIG. 3.

DETAILED DESCRIPTION OF PREFERRED EMBODIMENTS

The invention relies especially on the use of specific wavelets, or pre-wavelets, based on the orthogonalization of complementary bases.

It may be envisaged similarly to apply the invention to box-spline type wavelets [2]. The first are pre-wavelets on triangular meshes whose significant coefficients are small in number. The box-spline wavelets are also constructed out of meshes and represent a means of constructing two-dimensional wavelets that are not based on the tensor product of one-dimensional wavelet bases.

The proposed method is an improvement of the previous method of mesh encoding developed in [7]. It relates to the encoding of fixed images but can also be applied to the encoding of intra images in the framework of video compression, especially encoding operations using meshes jointly for the estimation of the intra surface and for the estimation of the inter movement.

The approach can therefore generally be applied to the transmission and storage of images.

Among the applications in which the method can be used, we can therefore cite:
- teleconferencing-related applications;
- the gradual transmission of natural images on a distributed network;
- the encoding of intra images in a video compression scheme based on the meshes and application to VOPs.

FIG. 3 therefore provides a simplified illustration of the general principle of the invention.

We shall consider a nested mesh (311), of a type known per se, defining a plurality of spaces $V_n$, each corresponding to a level of the mesh.

For each of these spaces, a search is made for the orthogonal bases (312), according to the technique described in detail here below. Encoding matrices are deduced (313) therefrom, making it possible to determine optimized image coefficients for each of the levels of the mesh.

It must be noted that these operations are independent of the contents of the image. They are simply linked to the mesh used. It may therefore advantageously be a preliminary step 31, producing encoding and decoding matrices that could then be used for a plurality of images, provided that they are associated with the same mesh.

An encoding step 32 is therefore provided. This step 32 can be repeated several times (321) without returning to the computation of the orthogonal bases. There is thus a relatively simple method available, the matrices having been computed once and for all.

For each received source image (322), which may especially be a fixed image or an intra image of a video stream, the image coefficients corresponding to each level of the mesh are computed (323) using matrices, and then the coefficients obtained are transmitted (34) or stored.

The decoding operation 33 entails the same operations in reverse. For this decoding operation, there are decoding matrices available. These matrices may be installed definitively in the memory or they are received (331), for example at the beginning of a video stream, to initialize the decoder.

At the reception (332) of the encoded coefficients, the decoder gradually reconstructs (333) each image up to the level of quality sought.

The fact that the same bases may be used for several images enables the definition of an advantageous signal structure, as illustrated in FIG. 5.

The signal comprises a first initialization part 51, which contains the bases of functions determined once and for all, and a second image data part 52, comprising coefficients determined by means of said bases. Thus a reduced bit rate is obtained, the first part 51 being transmitted only once, at the beginning of the sequence.

When there are several sets of bases of functions 511, 512, . . . corresponding to an equivalent number of images, a system for the identification of these images is provided. For each image or series of images, or simply when a change is necessary, an identifier 5211 is transmitted as the preamble of the data 521 of an image, this identifier indicating the set of bases of functions to be used.

Distinct transmission streams can be planned for the parts 51 and 52. It is also possible to plan for at least two streams for the part 52: one first stream corresponds to one or more "coarse" levels, and several other streams corresponding to more refined levels. Depending on need, the bit rate and/or the means available, the streams used are selected.

It is also possible to plan that the first part 51 will be known once and for all by the terminals (for example in the form of a CD-ROM). In this case, only the part 52 is transmitted, and this corresponds to a very low bit rate.

The same principle can also be applied, of course, to the data media storing images thus encoded.

A more detailed description shall now be given of the implementation of an embodiment of the invention.

1. The Definition of the New Coefficients

It shall be considered here that there are nested spaces $V_0$, $V_1$, . . . , $V_n$, available, associated with also nested triangular meshes. The dimension of the spaces corresponds to the number of vertices of the mesh considered. It is assumed that, for each space $V_n$, there is available a base $\phi_i^{(p)}$ where each function is univocally associated with the vertex i. In general, the invention uses bases of functions for which the restriction to each triangle is polynomial.

In the example described here below, it shall be considered for the sake of simplification that a space $V_n$ is associated with each of the levels of decomposition of the mesh. The invention can be applied of course also to the case where nested spaces $V_m$ to $V_l$ are associated solely with the consecutive levels of decomposition m to l of the mesh, where m and l are two integers of any value. For example, the principle of the invention described here below in this document can be implemented only for the levels of decomposition 3 to 12 of the mesh, associated with nested spaces $V_3$ to $V_{12}$.

The affine base presented in the Appendix 2 is a particular case of such bases where the polynomials considered are first-degree polynomials, i.e. the vector spaces in which the operation is located are limited to globally continuous and piecewise affine functions. So as to use the properties of multiresolution, a search is made for bases connected from one level to another by a refinement equation of the following type:

Through the mesh hierarchy, we have a sequence of nested spaces, each corresponding to a given representation and image quality. While there are spaces $V_n$ and $V_{n+1}$ available, it is sought here to find a base of the space $W_n$ such that $V_n \oplus W_n = V_{n+1}$ where $\oplus$ designates the orthogonal sum of the two vector spaces. It is known that it is therefore possible to write as follows for the approximation of the image I:

$$\hat{I} = \sum_{i=1}^{N_0} \alpha_i^{(0)} \varphi_i^{(0)} + \sum_{p=1}^{P} \sum_{i=1}^{N_p} \beta_i^{(p)} \psi_i^{(p)} \qquad (7)$$

where the index p describes the set of the different resolutions and $N_p$ designates the dimension of $W_p$.

The functions $\psi_i^{(p)}$ are selected so as to constitute a base of the space $W_p$. Furthermore, $\dim W_p = \dim V_{p+1} - \dim V_p$, hence the number of functions $\psi_i^{(p)}$ is equal to the number of new vertices for the resolution p. The base functions of $W_p$ can therefore be associated bijectively with the new vertices.

These functions are called pre-wavelets. In a particular case where the base functions of the same level are mutually orthogonal, they will be called wavelets.

Practically speaking, the obstacles encountered in the application of the method stem from the difficulty of exhibiting the bases $(\psi_i^{(p)})$ whose functions have supports limited to a finite number that is the smallest possible number of triangles contiguous to the reference vertex. Thus it is not possible to be limited to arbitrarily orthogonalizing the initial base. Practical examples of application where the method can be applied are given in the following sections.

Once such a decomposition of approximations of the image is available, the coefficients obtained can be encoded according to the classic methods. It may be noted, that in this case, the orthogonality between two successive levels of resolution invalidates a differential encoding: the coefficients obtained are directly quantified and encoded by means of an arithmetic encoder.

2. Practical Computation of the New Coefficients

To simplify the description, the computation is described in detail for the case where we have simply two successive spaces $V_0$ and $V_1$. A search is therefore made for a base of the space $W_0$. Since each function $(\psi^{(0)}_i)$ of this base belongs to the space $V_1$ and since $V_0 \oplus W_0 = V_1$ it is known that there are coefficients $w_{ij}$ such that:

$$\psi_i^{(0)} = \sum_{j=1}^{N_1} w_{ij}^{(0)} \varphi_j^{(1)} \tag{8}$$

The first step of the algorithm therefore consists in determining the matrix $W^{(0)} = (w_{ij})$.

Indeed, this matrix constitutes the matrix of passage from the base $(\varphi_i^{(1)})$ of the space $V_1$ to the base of the pre-wavelets of the space $W_0$. It will be noted that these computations are independent of the contents of the image and actually depend only on the form of the mesh and the type of base chosen. A precomputation can therefore be made for the classically used meshes. This precomputation depends on the way in which the bases of pre-wavelets are built. The sub-section 5.4 and the section 6 show practical examples of such constructions. Similarly, W(p) denotes the same matrix for the levels p and p+1.

We shall now describe the effective computation of the coefficients on the basis of the preceding matrices of passage. If, for a given image, there are p levels of resolution:

$$\hat{I}_p = \sum_{i=1}^{N_p} \alpha_i^{(p)} \varphi_i^{(p)} \tag{9}$$

For each level, it is possible to compute the coefficients $(\beta(p)i)$ that correspond to the coefficients of the equation (7) by resolving a linear system. Indeed we have:

$$V^{(p-1)} \alpha^{(p-1)} = \alpha^{(p)} \tag{10}$$

$$W^{(p-1)} \beta^{(p-1)} = \alpha^{(p)} \tag{11}$$

To obtain the desired coefficients, it is therefore enough to resolve the linear system:

$$A^{(p-1)} X = \alpha^{(p)} \tag{12}$$

with $$A^{(p-1)} = \begin{pmatrix} V^{(p-1)} \\ W^{(p-1)} \end{pmatrix}$$

The vector X being formed by coordinates of approximation of the image in the new base.

Among the effective methods of resolution of such linear systems, different methods may be singled out, including iterative methods. The invention is oriented rather towards methods of resolution based on the use of the properties of sparse matrices. Naturally, this method is applicable in practice only inasmuch as the corresponding matrices are sparse enough to enable acceptable complexity in terms of computation time through the use of profile matrices.

In this precise case, this property corresponds to limiting the support of the pre-wavelet functions used to a sufficiently small number of vertices. These methods of resolution of linear systems constitute a first possibility. However, there may be other solutions liable to accelerate the computation time and prevent the explicit resolution of the totality of the linear system.

We shall use a few examples to illustrate the way in which bases of pre-wavelets can be exhibited on the meshes.

3.1 Determining the Bases

Here below, we give the example of pre-wavelets based on affine and finite Lagrange element functions. The k-disk $D_{i,k}^{(p)}$ around the vertex i of the mesh is defined as the set of vertices that can be connected by a path constituted by fewer than k ridges of the mesh of the level p (see FIG. 3). It is sought here simply to construct the base of pre-wavelets as being the orthogonal projection of $(\varphi^{(p+1)}_i)$ on $W_p$ with supports limited to a k-disk about the vertex i, where i describes the set of the nodes of the level p+1 that did not exist at the level p. The functions $(\psi^{(p)}_i)$ are expressed as follows for the values of i corresponding to the vertices which belong to the level p but did not exist at the level p−1:

$$\psi_i^{(p)} = \varphi_i^{(p+1)} - \sum_{j \in D_{i,k}^{(p)}} q_{ij} \varphi_j^{(p)} \tag{13}$$

To determine the coefficients of the matrix $Q = q_{ij}$ the conditions of orthogonality of $\psi^{(p)}_i$ must be written with $V_p$. The following is therefore written as:

$$\forall k=1, \ldots, N_p, \langle \psi_i^{(p)}, \phi_k^{(p)} \rangle = 0$$

or again (for i new vertex and k old vertex):

$$\langle \varphi_i^{(p+1)}, \varphi_k^{(p)} \rangle = \sum_{j \in D_i^{(p)}} q_{ij} \langle \varphi_j^{(p)}, \varphi_k^{(p)} \rangle \tag{14}$$

Through the refinement equation, the expression $V_p$ as a function of $V_{p+1}$ is known. It is deduced therefrom that Q is a solution of the linear system depending only on the scalar products of same level functions. These scalar products can be computed according to the measurement of the triangles [6].

We are now in a position to deduce the coefficients of the matrix W by $$\varphi_i^{(p+1)} = \varphi_i^{(p)} + \frac{1}{2} \sum_{j \in V_i^{(p)}} \varphi_j^{(p)} \qquad (15)$$

using the refinement equation (4). The following sub-section explains the procedures useful for the computation and encoding of the image.

3.2. Computation and Encoding

Let us assume that it is sought to encode an image on which there are two mesh levels. In the first step of the algorithm, the method described in [7] is used to carry out an optimization of the nodal values on the basis of affine finite elements $\phi^{(p)}_i$, where i describes the set of vertices of the level 1. The decomposition given by the equation (3) is thus obtained.

It may be recalled that the minimizing of the mean square error defined in the equation (2) amounts to the resolution of the linear system that is resolved by profile methods [7]. This linear system is written as follows:

$$E = \sum_{(x,y) \in \Omega}^{N} \left( I(x, y) - \sum_{n \in V_p} \alpha_n^{(p)} \varphi_n^{(p)}(x, y) \right)^2$$

We shall therefore consider the image defined by its pixel values I(x,y). It is sought to minimize E, where Ω represents the set of pixels of the image and Vp the set of vertices having the level of resolution p. The minimum is obtained by writing the Np equations:

$$\frac{\partial E}{\partial \alpha_n^{(p)}} = 0, n = 1, \ldots, N_p$$

For a given vertex n, S(n) is written as the support of the function $\phi(p)n$, and we then have the following Np equations:

$$\sum_{(x,y) \in S(n)} \sum_{k \in V_n^{(p)}} \varphi_n(x, y) \varphi_k(x, y) \alpha_k^{(p)} = \sum_{(x,y) \in S(n)} I(x, y) \varphi_n(x, y)$$

It is therefore necessary to resolve the linear system Ax=B where the matrix A and the vector B are computed as follows, after A and B are set at 0:

```
For i=1,...,N_T (number of triangles for the mesh considered)
    For (x,y) in T_i (scanning of the pixels of the triangle T_i)
        For j=1 to 3 (vertices of T_i)
            Computation of f_j = φ_m(j)(x,y) where m(j) is the index
of the j^th vertex of T_i
        For (k=1 to 3, j =1 to 3) (rem. If (k,j) is done, then (j,k) is not
done)
            A_m(k),m(j) = A_m(k),m(j) + f_k * f_j
        For (j= 1 to 3)
            B_m(j) = B_m(j) + f_j * I(x,y)
        End for j
End for i
```

Algorithm 1: Optimization of the Nodal Values

Since the matrix A is positive definite symmetric and has a large number of zero values, the linear system is resolved by a profile method.

Now that we have coefficients α, let us determine the coefficients on the basis of the pre-wavelets. From the equation (15), a linear system is deduced enabling the decomposition of the image in the form (7) for P=p. Let us describe the passage between two levels, i.e. the passage from the writing:

$$\hat{I} = \sum_{i=1}^{N_p} \alpha_i^{(p)} \varphi_i^{(p)} + \sum_{k=p+1}^{P} \sum_{i=1}^{N_p} \beta_i^{(k)} \psi_i^{(k)}$$

to the writing:

$$\hat{I} = \sum_{i=1}^{N_{p-1}} \alpha_i^{(p-1)} \varphi_i^{(p-1)} + \sum_{k=p}^{P} \sum_{i=1}^{N_p} \beta_i^{(k)} \psi_i^{(k)}$$

At each step, therefore, it is sought to resolve a linear system Cx=α where the coefficients of the matrix C are the coefficients of synthesis. The matrix C is set at 0. In the present case, the matrix C will be determined by using the equations (4) and (13). Initially, the algorithm used to compute the coefficients qij of the equation (13) shall be given. For this purpose, a system Dq=E is deduced from the equations (14).

To simplify the description, the k-disk is considered here to be equal to the entire mesh. The matrices D and E are set at 0. With:

$$E_{lk} = \langle \phi_l^{(p)}, \phi_k^{(p)} \rangle$$

$$B_{li} = \langle \phi_l^{(p)}, \phi_i^{(p+1)} \rangle$$

If a mesh is selected for which all the triangles of a same level have the same area: we have the following relationships by which the preceding coefficients [6] can easily be computed:

For $i \neq j$:

$$\langle \varphi_i^{(p)}, \varphi_j^{(p)} \rangle = \frac{1}{6} \sum_{T \in S(i) \cap S(j)} A(T)$$

For $i = j$:

$$\langle \varphi_i^{(p)}, \varphi_j^{(p)} \rangle = \frac{1}{12} \sum_{T \in S(i) \cap S(j)} A(T)$$

This new linear system is again a system with a sufficiently sparse matrix. This enables the use of an adapted method. However, since the matrix is not positive symmetric, to apply the profile methods, the linear system Cx=α is replaced by the equivalent system tCCx=tCα. A linear system is thus obtained with a corresponding matrix that is truly positive definite symmetric (indeed C is reversible). This system is less sparse, but the corresponding matrix again has an acceptable profile.

When there are more than two levels of meshes available, the above-described process is iterated. Once this decomposition is available for all the levels of resolution, namely the coefficients α(0)i and β(p)i of the equation (7), a scalar quantification is carried out and the corresponding quantified values are transmitted to a selected vertex in the tree of refined triangles.

The decoding phase is performed by synthesizing the coefficients, this time directly with the matrix C and not its inverse. This gives coefficients by which it is possible to obtain a total reconstruction of the image by simple interpolation.

4. Second Example

Another example is given here of a fixed image encoding scheme as an application of the present method. The ridge-based pre-wavelets described in the appendix 1 are used here. The phase of optimization of the nodal values is common with the first example.

In this case, the wavelet coefficients are computed also through the resolution of a linear system Cx=α. To determine the coefficients of the matrix C, the following algorithm is then applied:

```
For i=1,...,N_p
    C_ii = 1
    For j as a neighbor of i in the mesh
        C_ij = 1
    End for j
End for i
For i= N_p+1,...,N_p+1
    C_ii = U determined by the position of the corresponding ridge i
    C_ij ≠ 0 is computed for the cases determined in the previous subsection
End for i
```

Algorithm 2: Filling of the Matrix of Passage C.

It may be noted that this method does not entail any implementation on the edges. Indeed, the mode of construction of the pre-wavelets has taken account of the different configurations possible for any bounded mesh.

5. Application with "Box Splines"

5.1 Description of the Method

The method can also be applied to other types of construction of wavelets or pre-wavelets. It is also possible to construct explicit bases of wavelets from nested spaces on which a multi-resolution has been built. A general method for the construction of multi-dimensional wavelet bases is developed in [3]. The value of using such wavelets as compared with the wavelets constructed by tensor product lies in the fact that the basic functions are better suited to the multi-dimensional framework.

The document [2] takes this principle up again and furthermore gives a method making it possible to determine a base of pre-wavelets with compact support which will therefore be directly usable in practice. It is proposed here to apply this decomposition in a box-spline wavelet operation.

5.2 Algorithm

Exemplary box-spline functions are given in [2]. The explicit coefficients of the basic functions are given therein. It is therefore possible, as above, to deduce a matrix of passage W enabling us to determine the corresponding wavelet coefficients. The algorithms are written exactly as follows: for example, the coefficients may be deduced directly from the example explained in [2].

APPENDIX 1

A ridge is said to be an internal ridge if it demarcates two triangles of the mesh. If not it is said to be an external ridge. The ridge may be internal with its two vertices being internal (a), internal with one of its two vertices being external (b), internal with its two vertices being external (c) or again it may itself be external (d). The different cases are shown in FIG. 2. A representation base of this kind therefore has the advantage of being adapted to multiresolution and of being easy to use, thanks to the small size of the support used.

We may recall the explicit expression of Quak's pre-wavelets in the different cases. Let us consider the first case. Let u be the new vertex considered, let $a_1$ and $a_2$ be the two vertices and s and t their respective instances of connectivity at the mesh level 1: we then have a possible pre-wavelet $\psi_u^{(0)}$ in writing:

$$\psi_u^{(0)} = U\varphi_u^{(1)} + A_1\varphi_{a_1}^{(1)} + A_2\varphi_{a_2}^{(1)} + \sum_{i=1}^{s-1} B_i\varphi_{b_i}^{(1)} + \sum_{i=1}^{t-1} C_i\varphi_{c_i}^{(1)} \quad (16)$$

where $b_i$ describes the vertices connected with $a_1$ and different from u and $c_i$ describes the vertices connected with $a_2$ and different from u. For a given vertex a, the function $\phi_a$ herein designates the affine finite element associated with the vertex a for the corresponding mesh.

The expression of the coefficients is given by:

$$A_1 = -\frac{3\sqrt{21}}{2s}$$

$$A_2 = -\frac{3\sqrt{21}}{2t}$$

$$U = -\frac{1}{14}(A_1 + A_2) + \frac{1+\lambda^s}{1-\lambda^s} + \frac{1+\lambda^t}{1-\lambda^t}$$

$$B_i = -\frac{1}{14}A_1 + \frac{\lambda^i + \lambda^{s-i}}{1-\lambda^s}$$

$$C_i = -\frac{1}{14}A_2 + \frac{\lambda^j + \lambda^{t-j}}{1-\lambda^t}$$

with:

$$\lambda = -\frac{5}{2} + \frac{\sqrt{21}}{2}$$

In the latter case, it is assumed that one of the two ends of the ridge is an external vertex of the mesh. Then, $s_1$ denotes the number of vertices neighboring $a_1$ and located to the left of the ridge considered and $s_2$ denotes the number of vertices neighboring $a_1$ and located to the right of the ridge. The corresponding coefficients are respectively written as $B^1_i$ and $B^{21}_i$. We then have the following expression of the coefficients:

$$A_1 = -\frac{3\sqrt{21}}{2(s_1 + s_2)}$$

$$A_2 = -\frac{3\sqrt{21}}{2t}$$

$$U = -\frac{1}{14}(A_1 + A_2) + \frac{(\lambda^{s_1} + \lambda^{-s_1})(\lambda^{s_2} + \lambda^{-s_2})}{\lambda^{-s_1-s_2} - \lambda^{s_1+s_2}} + \frac{1 + \lambda^t}{1 - \lambda^t}$$

$$B_i^1 = -\frac{1}{14}A_1 + \frac{\lambda^{s_2} + \lambda^{-s_2}}{\lambda^{-s_1-s_2} - \lambda^{s_1+s_2}}(\lambda^{i-s_1} + \lambda^{s_1-i})$$

$$B_i^2 = -\frac{1}{14}A_1 + \frac{\lambda^{s_1} + \lambda^{-s_1}}{\lambda^{-s_1-s_2} - \lambda^{s_1+s_2}}(\lambda^{i-s_2} + \lambda^{s_2-i})$$

$$C_j = -\frac{1}{14}A_2 + \frac{\lambda^j + \lambda^{t-j}}{1 - \lambda^t}$$

In the third case, the same notations are used by distinguishing also $t_1$ which denotes the number of vertices neighboring $b_1$ and located to the left of the ridge considered and $t_2$ which denotes the number of vertices neighboring $b_1$ and located to the right of the ridge.

$$A_1 = -\frac{3\sqrt{21}}{2(s_1 + s_2)}$$

$$A_2 = -\frac{3\sqrt{21}}{2(t_1 + t_2)}$$

$$U = -\frac{1}{14}(A_1 + A_2) + \frac{(\lambda^{s_1} + \lambda^{-s_1})(\lambda^{s_2} + \lambda^{-s_2})}{\lambda^{-s_1-s_2} - \lambda^{s_1+s_2}} + \frac{(\lambda^{t_1} + \lambda^{-t_1})(\lambda^{t_2} + \lambda^{-t_2})}{\lambda^{-t_1-t_2} - \lambda^{t_1+t_2}}$$

$$B_i^1 = -\frac{1}{14}A_1 + \frac{\lambda^{s_2} + \lambda^{-s_2}}{\lambda^{-s_1-s_2} - \lambda^{s_1+s_2}}(\lambda^{i-s_1} + \lambda^{s_1-i})$$

$$B_i^2 = -\frac{1}{14}A_1 + \frac{\lambda^{s_1} + \lambda^{-s_1}}{\lambda^{-s_1-s_2} - \lambda^{s_1+s_2}}(\lambda^{i-s_2} + \lambda^{s_2-i})$$

$$C_j^1 = -\frac{1}{14}A_2 + \frac{\lambda^{t_2} + \lambda^{-t_2}}{\lambda^{-t_1-t_2} - \lambda^{t_1+t_2}}(\lambda^{i-t_1} + \lambda^{t_1-i})$$

$$C_j^2 = -\frac{1}{14}A_2 + \frac{\lambda^{t_1} + \lambda^{-t_1}}{\lambda^{-t_1-t_2} - \lambda^{t_1+t_2}}(\lambda^{i-t_2} + \lambda^{t_2-i})$$

Finally in the last case, where the ridge is external we have:

$$A_1 = -\frac{3\sqrt{21}}{2s}$$

$$A_2 = -\frac{3\sqrt{21}}{2t}$$

$$U = -\frac{1}{14}(A_1 + A_2) + \frac{2(\lambda^{-s} + \lambda^s)}{\lambda^{-s} - \lambda^s} + \frac{2(\lambda^{-t} + \lambda^t)}{\lambda^{-t} - \lambda^t}$$

$$B_i = -\frac{1}{14}A_1 + \frac{2}{\lambda^{-s} - \lambda^s}(\lambda^{i-s} + \lambda^{s-i})$$

$$C_j = -\frac{1}{14}A_2 + \frac{2}{\lambda^{-t} - \lambda^t}(\lambda^{j-t} + \lambda^{t-j})$$

In all instances, there is the expression of the pre-wavelet corresponding to the new vertex according to the base of the affine functions of the finest level.

APPENDIX 2

1. Approximation of Surfaces

To simplify matters, we consider an image in terms of gray levels (luminance). For the chrominance bands, a similar method may be applied. The image may therefore be considered to be a discretized representation of a parametrical surface. We look more closely here at the representation of this surface by a mesh.

Figure 1:
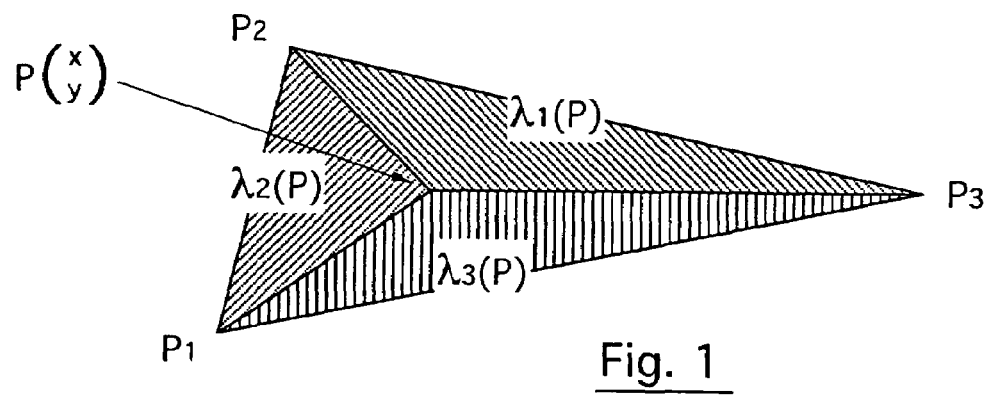
FIG. 1 illustrates the way in which the coordinates of a point P are determined.
Figure 4:
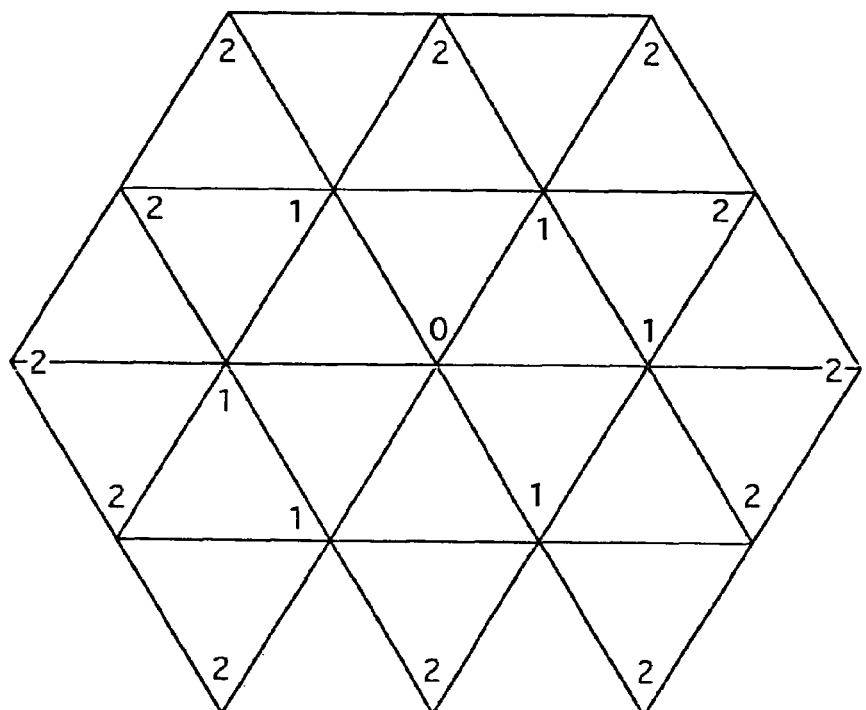
FIG. 4 illustrates a k-disk taken into account for the computation of the pre-wavelet functions, in an exemplary implementation of the invention.

It is assumed here that the mesh available is any unspecified mesh covering the entire domain of the image. The Lagrange base functions $C^0$ centered on a vertex are then used. Thus an approximation $\hat{I}$ of the image I in the following form is obtained:

$$\hat{I} = \sum_{i=1}^{N} \alpha_i \varphi_1, \forall i, \alpha_1 \in R \quad (1)$$

where N designates the number of vertices of the mesh, $\phi_i$ is the affine function taking the value 1 on the vertex i and such that the value at a point of one of the triangles of which i is the vertex is equal to the barycentric coordinates of this point relative to the vertex i (see FIG. 1). This function is therefore zero outside the triangular faces, one of whose vertices is the vertex i. The coefficients $\alpha_i$ are computed so as to minimize the mean square error:

$$E = \left\| I - \sum_{i=1}^{N} \alpha_i \varphi_1 \right\|_{L^2} \quad (2)$$

on the support of the image.

2. Hierarchy of the Meshes

The method uses a hierarchy of nested triangular meshes. Initially, there is a triangular mesh available. Then a mesh decomposition rule is adopted. It is possible for example to obtain the following meshes by inserting a new vertex in the middle of each ridge of the mesh.

In this case, each triangle is divided into four new triangles. This depiction of the image is used so as to have successive approximations of the image available, each corresponding to a given resolution. This hierarchy is then exploited by subdividing only the triangles whose mean square error of reconstruction is above a certain threshold. The value of this threshold partly determines the desired reconstruction quality. Thus, a tree for the decomposition of the hierarchy is obtained. This tree must be transmitted to the encoder and enables the decoder to determine which are the refined triangles.

3. Encoding of the Coefficients

In all cases, values are transmitted for the basic level (the coarsest level of the hierarchy). Indeed, these values are necessary for a minimum reconstruction of the image. At the level 0 we have:

$$\hat{I} = \sum_{i=1}^{N_P} \alpha_i^{(0)} \varphi_i^{(0)}$$

At the level 1, we can therefore write:

$$\hat{I} = \sum_{i=1}^{N_1} \alpha_i^{(1)} \varphi_i^{(1)} = \sum_{i=1}^{N_0} \alpha_i^{(1)} \varphi_i^{(1)} + \sum_{i=N_0+1}^{N_1} \alpha_i^{(1)} \varphi_i^{(1)}$$

where the $N_0$ first vertices correspond to the vertices of the level 1 mesh that already existed in the level 0 mesh, and the $N_1$-$N_0$ vertices of the second term correspond to the level 1 vertices that did not exist at the level 0. At any unspecified level p, there is therefore the following representation available:

$$\hat{I} = \sum_{i=1}^{N_p} \alpha_i^{(p)} \varphi_i^{(p)} = \sum_{i=1}^{N_{p-1}} \alpha_i^{(p)} \varphi_i^{(p)} + \sum_{i=N_{p-1}+1}^{N_p} \alpha_i^{(p)} \varphi_i^{(p)} \quad (3)$$

The first term of the sum corresponds to the $N_p$ vertices of the level of resolution p and the second term of the sum corresponds to the new vertices inserted into the level p+1. For the $N_p$ first vertices, we have:

$$\varphi_i^{(p)} = \varphi_i^{(p-1)} - \frac{1}{2} \sum_{j \in V_i^{(p)}} \varphi_j^{(p)} \quad (4)$$

where $V_i^{(p)}$ represents the set of the vertices neighboring the vertex i in the mesh p.

The representation of the image can therefore be expressed in the following differential form:

$$\hat{I} = \sum_{i=1}^{N_0} \alpha_i^{(0)} \varphi_i^{(0)} + \sum_{p=0}^{P-1} \sum_{i=1}^{N_p} \delta_i^{(p)} \varphi_i^{(p)} \quad (5)$$

4. Observation:

In order to homogenize the coefficients thus obtained, the average value of the first-level coefficients is deducted from these coefficients. This representation enables the exploitation of the spatial redundancies related to the statistical correlation between proximate pixels in the image. The compression is done by means of a quantification of these coefficients followed by an adaptive arithmetic encoding. Furthermore, the coefficients that do not belong to any of the triangles selected in the adaptive refinement step are not encoded; indeed, not refining a triangle amounts to considering that the coefficients of the vertices corresponding to the finer resolutions within this triangle are the interpolated values. This is equivalent to assigning 0 to the coefficient $\delta_i^{(p)}$.

5. Value of the Method

The method therefore makes it possible to obtain a simple scheme for the encoding of fixed images by means of the use of a hierarchy of nested regular meshes. This makes it possible to obtain efficient compression rates. Furthermore, such an encoding scheme is well suited to a scalar transmission of the coefficients.

APPENDIX 3

References

[1] Michael Floater and Ewald Quak, Piecewise linear prewavelets on arbitrary triangulations, Numerische Mathematik Springer-Verlag 1999, 82, pp. 221-252

[2] Sherman D. Riemenschneider and Zuowei Shen, Wavelets and PreWavelets in Low Dimension, Analysis and Approximation Theory Seminar University of Alberta

[3] Yves Meyer, Ondelettes, Hermann, 1990

[4] Amir Said and William Pearlman. A new, fast, and efficient image codec based on set partitioning in hierarchical trees. IEEE Transactions on Circuits and Systems for Video Technology, 6(3):243-250, June 1996

[5] David Taubman. High Performance Scalable Image Compression with EBCOT 1999

[6] P.-A. Raviart and J. M. Thomas. Introduction à l'Analyse Numérique des-Equations aux Dérivées Partielles. Masson, 1992.

[7] Patrick Lechat and Henri Sanson. Combined mesh-based image representation and motion estimation, application to video coding. Proc. of ICIP 98, vol.2 pp 909-914, Chicago-USA, Oct. 4-7 1998

[8] Gwenaelle Marquant. Représentation par maillage adaptatif déformable pour la manipulation et la communication d'objets video. Thèse, décembre 2000 Université de Rennes 1

The invention claimed is:

1. A method for the encoding of at least one source image implementing a hierarchical mesh defining at least two nested spaces, each corresponding to a level of decomposition of the mesh, comprising:

a preliminary step for associating a mathematical space of representation of an image $V_n$ such that $V_n = V_{n-1} \oplus W_{n-1}$, with at least one decomposition level n other than the first level of decomposition, where:

$V_{n-1}$ is the space associated with the decomposition level n−1; and $W_{n-1}$ is a space orthogonal to $V_{n-1}$;

a preliminary step for obtaining orthogonal bases, delivering a base of piecewise affine functions ($\phi_{n-1}$ of said space $V_{n-1}$ and a base of functions of pre-wavelets $\psi_{n-1}$ of said space $W_{n-1}$ forming two orthogonal bases, such that, with space $V_n$ there is associated, firstly, a base of piecewise affine functions $\phi_n$, and, secondly, a base formed by the combination of said two orthogonal bases; and a step for determining, at said decomposition level n other than the first level of decomposition, image coefficients expressed only in the base of pre-wavelet functions $\psi_{n-1}$ defined in said space $W_{n-1}$ orthogonal to said space $V_{n-1}$ corresponding to the decomposition level n−1, the pre-wavelet functions being selected so that the image coefficients enable the optimizing, for said decomposition level n, of the information already transmitted for a preceding decomposition level n−1;

so as to enable the production of a reconstructed image, representing the at least one source image, with a quality of restoration optimized for said decomposition level n.

2. The method according to claim 1, characterized in that, at all of the levels of decomposition n, there are delivered only image coefficients expressed in the base of pre-wavelet functions defined in a space orthogonal to the space corresponding to the preceding decomposition level n−1.

3. The method according to claim 1, characterized in that the pre-wavelet functions are mutually orthogonal wavelet functions.

4. The method according to claim 1, characterized in that each of the pre-wavelet functions has a narrow support, limited to a predefined number of vertices of the mesh located in the neighborhood of a reference vertex for the function.

5. The method according to claim 1, characterized in that the pre-wavelet functions are one-dimensional.

6. The method according to claim 5, characterized in that each of the pre-wavelet functions is determined in taking account of the position, in the mesh, of at least one ridge bearing a new vertex of the mesh to which the function will be assigned.

7. The method according to claim 1, characterized in that the base $\phi_i^{(n-1)}$ is obtained by the following relationship $$\varphi_i^{(p+1)} = \varphi_i^{(p)} + \frac{1}{2} \sum_{j \in V_i^{(p)}} \varphi_j^{(p)}$$

where $V_i^{(n)}$ is the set of vertices neighboring the vertex j in the decomposition level n.

8. The method according to claim 1, characterized in that the pre-wavelet functions are multidimensional.

9. The method according to claim 8, characterized in that the pre-wavelet functions are box spline type functions.

10. The method according to claim 1, characterized in that the determining of the image coefficients at a mesh level n relies on the resolution of a linear system:

$$A^{(n-1)}X = \alpha^{(n)}$$

with:

$$A^{(p-1)} = \begin{pmatrix} V^{(p-1)} \\ W^{(p-1)} \end{pmatrix}$$

where X is the vector of coordinates of approximation of a source image $\alpha^{(n)}$, $W^{(n-1)}$ is the matrix of passage from the base $(\phi_i^{(n-1)})$ of space $V_{n-1}$ to the base of pre-wavelet functions of space $W_{n-1}$ and $V^{(n-1)}$ is the matrix of space $V_{n-1}$.

11. The method according to claim 10, characterized in that the resolution of the linear system implements an algorithm of the "sparse matrix" or "profile matrix" type.

12. The method according to claim 1, characterized in that it comprises: a preliminary step for determining the bases of reference functions $\phi_n$ and $\psi_n$ for a predetermined image structure; an image encoding step systematically using the bases of reference functions $\phi_n$ and $\psi_n$ for any image having the predetermined image structure.

13. The method according to claim 12 characterized in that, during the preliminary step, at least two sets of bases of reference functions $\phi_n$ and $\psi_n$ are determined, each corresponding to a particular predetermined image structure.

14. A device for the encoding of at least one source image implementing a hierarchical mesh defining at least two nested spaces, each corresponding to a level of decomposition of the mesh, comprising:

means for associating a mathematical space of representation of image $V_n$ such that $V_n = V_{n-1} \oplus W_{n-1}$, with at least one decomposition level n other than the first level of decomposition, where:

$V_{n-1}$ is the space associated with the decomposition level n−1;

$W_{n-1}$ is a space orthogonal to $V_{n-1}$, means for obtaining orthogonal bases, delivering a base of piecewise affine functions $\phi_{n-1}$ of space $V_{n-1}$ and a base of functions of pre-wavelets $\psi_{n-1}$ of space $W_{n-1}$, forming two orthogonal bases, such that, with said space $V_n$ it associates, firstly, a base of piecewise affine functions $\phi_n$ and, secondly, a base formed by the combination of said two orthogonal bases; and means for determining, at said decomposition level n other than the first level of decomposition, image coefficients expressed only in the base of pre-wavelet functions $\psi_{n-1}$ defined in said space $W_{n-1}$ orthogonal to said space $V_{n-1}$ corresponding to the decomposition level n−1, the pre-wavelet functions being selected so that the image coefficients enable the optimizing, for decomposition level n, of the information already transmitted for a preceding decomposition level n−1;

so as to enable the production of a reconstructed image, representing the at least one source image, with a quality of restoration optimized for decomposition level n.

15. The device according to claim 14, characterized in that, at all of the levels of decomposition n, there are delivered only image coefficients expressed in the base of pre-wavelet functions.

16. A method for the decoding of images encoded in the form of image coefficients obtained by the implementation of a hierarchical mesh defining at least two nested spaces, each corresponding to a level of decomposition of the mesh, according to an encoding associating, with at least one decomposition level n other than the first decomposition level, a mathematical space of representation of the image $V_n$ such that $V_n = V_{n-1} \oplus W_{n-1}$, where:

$V_{n-1}$ is the space associated with the decomposition level n−1; and $W_{n-1}$ is a space orthogonal to $V_{n-1}$;

the encoding also associating, with space $V_n$, firstly, a base of piecewise affine functions $\phi_n$ and, secondly, a base formed by the combination of two orthogonal bases comprising:

a base of piecewise affine functions $\phi_{n-1}$ of space $V_{n-1}$; and a base of functions of pre-wavelets $\psi_{n-1}$ of said space $W_{n-1}$;

the encoding further associating, with said decomposition level n other than the first level of decomposition, only image coefficients expressed in the base of pre-wavelet functions $W_{n-1}$ defined in said space $W_{n-1}$ orthogonal to said space $V_{n-1}$ corresponding to the decomposition level n−1;

the pre-wavelet functions being selected so that the image coefficients enable the optimizing, for decomposition level n, of the information already transmitted for a preceding decomposition level n−1;

characterized in that the method comprises:

a step for receiving said image coefficients; and a step for reconstructing said encoded images, representing source images, with a quality of restoration optimized for decomposition level n.

17. The method according to claim 16, characterized in that, with all levels n, there are associated image coefficients expressed in the base of pre-wavelet functions.

18. The method according to claim 16, characterized in that it comprises:
- a preliminary step for the reception and/or storage of bases of reference functions for at least one predetermined image structure;
- an image decoding step, using the bases of reference functions corresponding to the image structure of the image to be decoded.

19. A device for the decoding of images encoded in the form of image coefficients obtained by the implementation of a hierarchical mesh defining at least two nested spaces, each corresponding to a level of decomposition of the mesh, according to an encoding associating, with at least one decomposition level n, a mathematical space of representation of the image $V_n$ such that $V_n = V_{n-1} \oplus W_{n-1}$, where:

$V_{n-1}$ is the space associated with the decomposition level n−1; and $W_{n-1}$ is a space orthogonal to $V_{n-1}$;

and in that, with space $V_n$ there is associated, firstly, a base of piecewise affine functions $\phi_n$ and, secondly, a base formed by the combination of two orthogonal bases comprising:

- a base of piecewise affine functions $\phi_{n-1}$ of space $V_{n-1}$; and
- a base of functions of pre-wavelets $\psi_{n-1}$ of space $W_{n-1}$;

the encoding further associating, with said decomposition level n other than the first level of decomposition, only image coefficients expressed in the base of pre-wavelet functions $\psi_{n-1}$ defined in said space $W_{n-1}$ orthogonal to said space $V_{n-1}$ corresponding to the decomposition level n−1;

the pre-wavelet functions being selected so that the image coefficients enable the optimizing, for decomposition level n, of the information already transmitted for a preceding decomposition level n−1;

characterized in that the device comprises:
- means for receiving said image coefficients; and
- means for reconstructing said encoded images, representing source images, with a quality of restoration optimized for the at least one decomposition level n.

20. The device according to claim 19, characterized in that, with each level n of decomposition, there are delivered image coefficients expressed in a base of functions defined in a space orthogonal to the space corresponding to a preceding decomposition level n−1.

21. A computer readable storage medium storing a set of machine executable instructions, said instructions being executable by a computer adapted to implement the encoding of at least one source image implementing a hierarchical mesh defining at least two nested spaces, each corresponding to a level of decomposition of said mesh, to perform:

- a preliminary step for associating a mathematical space of representation of an image $V_n$ such that $V_n = V_{n-1} \oplus W_{n-1}$, with at least one decomposition level n other than the first level of decomposition, where:
  - $V_{n-1}$ is the space associated with the decomposition level n−1; and
  - $W_{n-1}$ is a space orthogonal to $V_{n-1}$;
- a preliminary step for obtaining orthogonal bases, delivering a base of piecewise affine functions $\phi_{n-1}$ of said space $V_{n-1}$ and a base of functions of pre-wavelets $\psi_{n-1}$ of said space $W_{n-1}$ forming two orthogonal bases, such that, with said space $V_n$ there is associated, firstly, a base of piecewise affine functions $\phi_n$ and, secondly, a base formed by the combination of said two orthogonal bases;
- a step for determining, at said decomposition level n other than the first level of decomposition, image coefficients expressed only in said base of prewavelet functions $\psi_{n-1}$ defined in said space $W_{n-1}$ orthogonal to said space $V_{n-1}$ corresponding to the decomposition level n−1, said prewavelet functions being selected so that said image coefficients enable the optimizing, for said decomposition level n, of the information already transmitted for the preceding decomposition level n−1, wherein the computer readable storage medium comprises:
- first data representing at least one set of bases of reference functions for at least one predetermined image structure, and
- second data representing at least two images encoded by means of one of the sets of bases of reference functions.

22. Computer readable storage medium according to claim 21, characterized in that the first data comprises at least two sets of bases of reference functions, corresponding to distinct image structures, and in that each image of the second data comprises a piece of information enabling the selection of one of the sets of bases of reference functions.

23. Computer readable storage medium according to claim 21, characterized in that data of the first data and/or the second data are organized so as to enable a gradual image reconstruction and/or with a predetermined level of reconstruction quality.

24. The method according to claim 1, wherein said images are fixed images or intra images of a stream of moving images.

25. The method according to claim 16, wherein said images are fixed images or intra images of a stream of moving images.

* * * * *